Patented Dec. 7, 1937

2,101,128

UNITED STATES PATENT OFFICE 2,101,128

COMPOSITE ARTICLE

Charles A. Cabell, Washington, D. C., assignor to Economy Fuse & Manufacturing Company, Chicago, Ill., a corporation of New York No Drawing. Application September 30, 1935, Serial No. 42,886

4 Claims. (Cl. 49—92)

This invention relates to new and improved composite articles and particularly to articles useful in the electrical art, such as tubes for fuses and like uses.

One of the objects of the present invention is to produce an article which is mechanically strong and which is resistant to the passage of an electric arc over its surface.

Another object of the present invention is to produce an article which is resistant to shock.

A further object within the purview of the present invention is to produce a composite article which is transparent and mechanically and electrically resistant.

Other objects, features, capabilities and advantages are comprehended by the invention, as will later appear and as are inherently possessed thereby.

A number of materials industrially available for the production of such articles have one or more of the desirable properties above enumerated but are so lacking in at least one of the properties as to render them non-usable.

Glass, for example, is transparent, mechanically strong, and non-tracking under an electric arc, but is somewhat brittle.

Phenolic materials are strong and non-hygroscopic but the ease with which conducting paths or tracks are formed upon the surface by the passage of even a low amperage arc therefore makes its use in electrical fuses extremely hazardous.

Now it has been found that a composite article which may be tubular or other shape, possesses all of the above enumerated desirable properties and may be made by combining glass and a cellulosic material such as regenerated cellulose. Such a regenerated cellulose is commercially available under the name of cellophane in the form of relatively thin transparent sheets or strips.

In the copending application of Oscar A. Cherry and Charles A. Cabell, entitled "Transparent laminated product and process of preparing same", Serial No. 42,885, filed September 30th, 1935, is described and claimed a method of producing a transparent, mechanically strong and shock-resistant tubular or sheet article. That process comprises winding a swollen sheet of cellophane or similar cellulosic material upon a core or mandrel and drying the wound article while still on the mandrel. The contractile forces set up serve to produce a substantially homogeneous article.

Such an article is mechanically strong and is quite shock-resistant. However, it sometimes tracks upon the passage of an electric arc. Therefore, though useful in many applications, it is not in the highest degree suitable for all uses, such as for instance, for fuse casings.

It has now been found that when a glass tube is used as the mandrel for the wrapping of such a cellulosic article that the cellulosic product cannot be removed from the glass tube except by breaking the glass. The breaking of the glass is accomplished only with great difficulty since the cellulosic material adheres so tightly to the glass as to materially strengthen the glass. This phenomenon is probably allied to that which causes the breakage of so called laminated glass to be so difficult. After the glass has been cracked it is still difficult to remove the fragments and thus free the cellulosic article from its liner.

Therefore, in the construction of the composite article of this invention, moistened sheets or strips of thin, transparent cellulosic material such as cellophane or similar material is wound onto a glass tube to form a cellulosic layer about 25/1000 of an inch in thickness. After drying, preferably at about 75 to 90 degrees C., another similar layer is wound on and dried. This process is continued until the required thickness is obtained.

After the final drying the product is cut to the exact length required and is then ready for use as a fuse casing, or for any other purpose wherein the above described properties are of importance.

As pointed out in said copending application above referred to, it is desirable to add to the water used for swelling the cellulosic material an adhesive such as gelatine in an amount corresponding to about 1½% of the weight of the water. If desired flame proofing salts may be added to the water for the purpose of rendering the cellulosic material non-inflammable.

When extreme shock resistance is required a shocking resistant glass such as Pyrex may be employed.

It is to be understood that a glass core of any desired shape may be used. If desired tubes of glass having various cross sectional shapes may be employed to make articles of various different shapes.

While I have herein described illustrative embodiments of the invention and a method or process of making same, it is to be understood that the invention is not limited thereto but may comprehend other constructions, arrangements of parts, details, features and process steps without departing from the spirit of the invention.

I claim:

1. A transparent article of commerce in the form of a tube, or the like, comprising a homogeneous mass of predetermined thickness composed of laminations of transparent cellulosic sheet material tightly adhered and contracted on a base of glass.

2. A transparent article of commerce in the form of a tube, or the like, comprising a homogeneous mass of predetermined thickness composed of laminations of transparent cellulosic sheet material tightly adhered on a glass base and having internal rigidifying and strengthening effect produced by contractile forces.

3. A transparent tube comprising a homogeneous mass of predetermined thickness composed of laminations of transparent cellulosic sheet material tightly adhered and contracted on a glass tube.

4. A transparent tube comprising a homogeneous mass of predetermined thickness composed of laminations of transparent cellulosic sheet material tightly adhered on a glass tube and having internal rigidifying and strengthening effect produced by contractile forces.

CHARLES A. CABELL.